United States Patent
Lawson et al.

(10) Patent No.: US 7,235,172 B2
(45) Date of Patent: Jun. 26, 2007

(54) OLEFIN PRODUCTION FROM STEAM CRACKING USING PROCESS WATER AS STEAM

(75) Inventors: Keith H. Lawson, Ponca City, OK (US); Scott A. Scholten, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 716 days.

(21) Appl. No.: 10/786,391

(22) Filed: Feb. 25, 2004

(65) Prior Publication Data
US 2005/0187415 A1 Aug. 25, 2005

(51) Int. Cl.
*C10G 9/36* (2006.01)
(52) U.S. Cl. ............... 208/130; 208/125; 208/128; 585/650
(58) Field of Classification Search ............ 208/125, 208/128, 130; 585/650
See application file for complete search history.

(56) References Cited

U.S. PATENT DOCUMENTS

| | | | |
|---|---|---|---|
| 3,114,698 A | 12/1963 | Viles | |
| 4,780,196 A | 10/1988 | Alagy et al. | 208/130 |
| 4,844,837 A | 7/1989 | Heck et al. | 252/373 |
| 4,927,857 A | 5/1990 | McShea, III et al. | 518/703 |
| 5,023,276 A | 6/1991 | Yarrington et al. | 514/703 |
| 5,139,650 A | 8/1992 | Lenglet | 208/132 |
| 5,149,464 A | 9/1992 | Green et al. | 252/373 |
| 5,500,149 A | 3/1996 | Green et al. | 252/373 |
| 5,654,491 A | 8/1997 | Goetsch et al. | 568/469 |
| 6,033,555 A | 3/2000 | Chen et al. | 208/52 |
| 6,118,035 A | 9/2000 | Fung et al. | 585/653 |
| 6,254,807 B1 | 7/2001 | Schmidt et al. | 252/373 |
| 6,333,294 B1 | 12/2001 | Chao et al. | 502/325 |
| 6,365,544 B2 | 4/2002 | Herron et al. | 502/326 |

(Continued)

FOREIGN PATENT DOCUMENTS

EP 0303438 A2 9/1988

(Continued)

OTHER PUBLICATIONS

No, B. I, et al., "Operational Efficiency of a Reactor Unit for High Temperature Gasoline Pyrolysis", Neftepererabotka I Neftekhimiya, Moscow, Russian Federation 2001, No. 8, pp. 29-31.

(Continued)

*Primary Examiner*—Tam M. Nguyen
(74) *Attorney, Agent, or Firm*—Conley Rose P.C.

(57) ABSTRACT

The invention includes a process for making olefins. In one embodiment, the process comprises producing steam from a process water comprising organic compounds, wherein the process water comprises at least a portion of a product water from a hydrocarbon synthesis process; feeding the steam comprising some organic compounds and a light hydrocarbons feedstream into a steam cracker under cracking promoting conditions so as to crack with said steam some of the light hydrocarbons and some of the organic compounds from the steam to produce a cracker effluent comprising at least one olefin. In some embodiments, the light hydrocarbons feedstream comprises a naphtha cut. In alternate embodiments, the light hydrocarbons feedstream comprises a hydrocarbon fraction derived from a hydrocarbon synthesis reactor. In preferred embodiments, the process water and light hydrocarbons feedstream are at least in part derived from a Fisher-Tropsch synthesis, and the organic compounds comprise oxygenates.

30 Claims, 1 Drawing Sheet

U.S. PATENT DOCUMENTS

| | | | |
|---|---|---|---|
| 6,402,989 B1 | 6/2002 | Gaffney | 252/373 |
| 6,407,301 B1 | 6/2002 | Foley et al. | 585/650 |
| 6,409,940 B1 | 6/2002 | Gaffney et al. | 252/373 |
| 6,461,539 B1 | 10/2002 | Gaffney | 252/373 |
| 6,462,097 B1 | 10/2002 | Martino et al. | 518/700 |
| 6,488,907 B1 | 12/2002 | Barnes et al. | 423/418 |
| 6,533,945 B2 | 3/2003 | Shah | 210/765 |
| 6,630,078 B2 | 10/2003 | Kourtakis et al. | 252/373 |
| 6,635,191 B2 | 10/2003 | Figueroa et al. | 252/373 |
| 2002/0037937 A1 | 3/2002 | Raje et al. | 518/715 |
| 2002/0115730 A1 | 8/2002 | Allison et al. | 518/703 |
| 2002/0173555 A1 | 11/2002 | Ionkina et al. | 518/715 |
| 2002/0177629 A1 | 11/2002 | O'Beck et al. | 518/703 |
| 2003/0065043 A1 | 4/2003 | Ionkina et al. | 518/714 |
| 2003/0119922 A1 | 6/2003 | Chao et al. | 518/715 |
| 2003/0125396 A1 | 7/2003 | Espinoza et al. | 518/726 |
| 2003/0134913 A1 | 7/2003 | Zhang et al. | 518/726 |
| 2003/0149121 A1 | 8/2003 | Zhang et al. | 518/728 |

FOREIGN PATENT DOCUMENTS

| | | |
|---|---|---|
| WO | WO 98/56873 A1 | 12/1998 |
| WO | WO 02/10313 A2 | 2/2002 |
| WO | WO 02/20395 A2 | 3/2002 |
| WO | WO 03/040262 A2 | 5/2003 |

OTHER PUBLICATIONS

Bharadway, S.S., et al, "*Catalytic Partial Oxidation of Natural Gas to Syngas*", Fuel Processing Technology, Jul. 12, 1994, pp. 109-127.

Zinger, Steve, "*Where is the Most Value for Ethylene and Olefin By-Products?*" Chemical Market Associates, pp. 486-501, 2001.

Towfighi, Jafar, et al., "*Steam Cracking of Naptha in Packed Bed Reactors*" American Chemical Society, Feb. 16, 2002 pp. 1419-1423.

Wakatsuki, T., et al., "*Development of a High Efficiency GTL Process Based on $CO_2$/Steam Reforming of Natural Gas and Slurry Phase FT Synthesis*", Elsevier Science B.V., 2001.

Van Rensberg, Dr. S.T.J., "*The Mossgas, Gas to Fuels Process*", ChemSA, Feb. 1990, pp. 41-42.

Nowak, S. et al., "*Cracking Dehydrogenation of Fischer-Tropsch Products in a Small-Scale Moving (Catalyst) Bed Cracking Tower*", Akademie Verlag Berlin, 1960, pp. 3-37.

Dancuart, Luis P., et al., "*Performance of the Sasol SPD Naphtha as Steam Cracking Feedstock*", ACS 2002 National Meeting pp. 1-11.

Nexant, Inc./Chem Systems, "*Fischer-Tropsch Liquids as Steam Cracker Feedstocks*", Nexant Inc./Chem Systems, Dec. 2002, pp. 1-58.

Choudhary, V.R. et al., "*Large Enhancement in Methane-to-Syngas Conversion Activity of Supported Ni Catalysts Due to Precoating of Catalyst Supports with MgO, CaO or Rare-Earth Oxide*", Jan. 4, 1995, pp. 387-390.

Hu, Yun Hang, "*Binary MgO-Based Solid Solution Catalysts for Methane Conversion to Syngas*", State University of New York, Dept. of Chemical Engineering, 2002, pp. 423-453.

Dry, M.E., "*The Fischer-Tropsch Synthesis*", Catalysis—Science and Technology, 1981, pp. 159-202.

Phillips, T.D. et al., "*Water Reuse and Re-Cycling at Sasol*", Water & Environmental Technology, Sasol Technology R&D, 2002, 1-9.

Mittal, K.G., et al., "*Higher Olefins and Alcohols as Raw Materials for Synthetic Detergents*", Indian Standards Institute Bulletin, 1971, vol. 23, No. 9 pp. 404-408.

OLEFIN PRODUCTION FROM STEAM CRACKING USING PROCESS WATER AS STEAM

BACKGROUND OF THE INVENTION

1. Field of the Invention

This invention relates to the field of hydrocarbon synthesis and more specifically to the field of olefin production from naphtha by steam cracking with process water from a gas-to-liquid plant, particularly from a Fischer-Tropsch synthesis process.

2. Background of the Invention

Large quantities of natural gas are available in many areas of the world, and natural gas is predicted to outlast oil reserves by a significant margin. However, natural gas reserves have been found in remote areas where it is uneconomical to develop the reserves due to the lack of local markets for the gas and the high cost of transporting the gas to distant markets. This high cost is often related to the extremely low temperatures needed to liquefy the highly volatile gas during transport. An alternative is to locally convert the natural gas to liquid hydrocarbon products that can be transported more cost effectively. Processes for converting light hydrocarbon gases, such as natural gas, to heavier hydrocarbon liquids are generally known in the art.

One such process, commonly known as gas to liquids (GTL) production, involves two sequential chemical transformations for converting natural gas to liquid fuels. In the first transformation, natural gas or methane, the major chemical component of natural gas, is reacted with oxygen and/or steam to form synthesis gas or syngas, which is a combination of carbon monoxide and hydrogen. In the second transformation employing the Fischer-Tropsch synthesis, carbon monoxide and hydrogen are converted into water and organic molecules containing mainly carbon and hydrogen. Those organic molecules containing only carbon and hydrogen are known as hydrocarbons. In addition, other organic molecules containing oxygen in addition to carbon and hydrogen, called oxygenates, may be formed during the Fischer-Tropsch synthesis. Hydrocarbons having carbons without ring formation are aliphatic hydrocarbons and may include paraffins and/or olefins. Paraffins are particularly desirable as the basis of synthetic diesel fuel.

The Fischer-Tropsch synthesis is commonly facilitated by a catalyst. Catalysts desirably have the function of increasing the rate of a reaction without being consumed by the reaction. A feed containing carbon monoxide and hydrogen is typically contacted with a catalyst in a reaction zone that may include one or more reactors.

The composition of a catalyst influences the relative amounts of hydrocarbons obtained from a Fischer-Tropsch catalytic process. Common catalysts for use in the Fischer-Tropsch synthesis contain at least one metal from Groups 8, 9, or 10 of the Periodic Table (in the new IUPAC notation, which is used throughout the present specification).

Cobalt, iron, ruthenium and/or nickel have been used as catalytic metal employed in catalysts used for the conversion of synthesis gas to hydrocarbons suitable for the production of diesel and/or gasoline fuels. Cobalt has been particularly desirable as a catalytic metal employed in Fischer-Tropsch catalysts for the production of heavy hydrocarbons from syngas. Iron has the advantage of being readily available and relatively inexpensive but has the disadvantage of a high water-gas shift activity, which converts a portion of carbon monoxide and some of the produced water to carbon dioxide and hydrogen. Nickel catalysts favor termination and are useful for aiding the selective production of methane from syngas. Ruthenium has the advantage of high activity but is quite expensive.

Typically, the Fischer-Tropsch product stream contains hydrocarbons having a range of numbers of carbon atoms varying from 1 to 100 or more, and thus having a range of molecular weights. Therefore, the Fischer-Tropsch products produced by conversion of natural gas commonly contain a range of hydrocarbons including gases, liquids and waxes. Depending on the molecular weight product distribution, different Fischer-Tropsch product mixtures are ideally suited to different uses. For example, Fischer-Tropsch product mixtures containing liquids may be processed to yield gasoline, as well as middle distillates. Hydrocarbon waxes may be subjected to an additional processing step for conversion to liquid and/or gaseous hydrocarbons. Thus, in the production of a Fischer-Tropsch product stream for processing to a fuel, it is desirable to maximize the production of high value liquid and/or wax hydrocarbons, such as hydrocarbons with at least 5 carbon atoms per hydrocarbon molecule ($C_{5+}$ hydrocarbons).

In addition to the hydrocarbon products of the Fischer-Tropsch process, product water is formed as shown in the following equation:

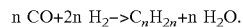

$$n\ CO + 2n\ H_2 \rightarrow C_nH_{2n} + n\ H_2O.$$

The water production is quite significant because a mole of water is produced for every mole of carbon monoxide converted. For non-shifting catalysts such as employing cobalt and/or ruthenium, the water gas shift reaction is minimal so the water production approaches that of the reaction stoichiometry. For shifting catalysts such as employing iron, the water gas shift reaction is more prominent, so the overall water production is still significant but less than the reaction stoichiometry predicts. The product water from a Fischer-Tropsch reactor is typically recovered from the reactor's gas outlet, by passing the gas effluent through a separation unit, for example a condenser to generate condensate water. Alternatively, a small portion of the product water may be recovered from the reactor's liquid product stream, by employing for example a separation technique such as filtration, settling, stripping and/or centrifugation. Typically, the product water contains water-soluble organic compounds. Most of these water-soluble organic compounds are oxygenates (oxygen-containing organic compounds) such as organic acids, alcohols, aldehydes, ketones, esters, aldols, carboxylic anions, and the like. Because the product water has typically little commercial value, it is usually considered a wastewater and sent to a wastewater treatment facility for processing and removal of the dissolved organic compounds. Drawbacks to this process include high costs of building and operating the wastewater facility. Alternatively, the product water may contain a significant amount of some of these organic compounds, and their recovery from the product water may be desirable to generate by-products with commercial value.

A portion of the hydrocarbon products obtained in the Fischer-Tropsch process comprises a Fischer-Tropsch naphtha. Fischer-Tropsch naphtha can be used as a feedstock for steam cracking in the production of olefins. The steam used for such cracking typically originates from natural sources of fresh water, such as from rivers or lakes. Drawbacks to using freshwater include the cost of purchasing or processing the freshwater. Processing typically includes removing particulates.

Consequently, there is a need for reducing the costs of processing the Fischer-Tropsch product water in a wastewater treatment facility. Further needs include more efficient ways for recovering and using the Fischer-Tropsch product water. In addition, there is a need for a more economical way to produce steam for the steam cracking of Fischer-Tropsch naphtha. Additional needs include a more efficient process for producing olefins from a hydrocarbon synthesis process.

BRIEF SUMMARY OF SOME OF THE PREFERRED EMBODIMENTS

These and other needs in the art are addressed in one embodiment by an inventive process for making olefins. The invention relates to a process for making olefins in a naphtha steam cracker using steam derived from at least a portion of a water comprising dissolved organic compounds and in a manner effective to convert at least a portion of the dissolved organic compounds simultaneously with naphtha components to valuable products, particularly olefins.

The process comprises producing steam from at least a portion of a water comprising organic compounds, such that the steam includes some organic compounds; feeding the steam and a hydrocarbon stream comprising light hydrocarbons into a steam cracker; and cracking in the presence of the steam under suitable cracking conditions at least a portion of the light hydrocarbons and at least a portion of the organic compounds from the steam to produce a steam cracker effluent comprising one or more olefins.

The water comprising organic compounds comprises one water source or combinations of water sources that comprise organic matter from any of the processes generated or used in a gas-to-liquid plant, such as a hydrocarbon synthesis process, a synthesis gas production process, and/or an alcohol synthesis process.

In one preferred embodiment, a process for making olefins comprises providing a process water comprising at least a portion of a product water from a hydrocarbon synthesis process, wherein the process water contains organic compounds; producing steam from the process water, wherein the steam includes at least a portion of the organic compounds from the process water; and feeding the steam and a hydrocarbon feedstream containing a light hydrocarbon into a steam cracker under suitable cracking conditions so as to crack in the presence of the steam at least a portion of the light hydrocarbon and at least a portion of the organic compounds from the steam and to form a steam cracker effluent, wherein the steam cracker effluent comprises at least one olefin.

The stream comprising light hydrocarbons preferably comprises naphtha. In some embodiments, the stream comprising light hydrocarbons comprises mostly paraffinic light hydrocarbons, and preferably comprises a highly-paraffinic naphtha. In preferred embodiments, the stream comprising light hydrocarbons preferably comprises a hydrocarbon product stream from a hydrocarbon synthesis process such as one using the Fischer-Tropsch synthesis, and more preferably comprises a naphtha derived from a Fischer-Tropsch synthesis.

In another embodiment, the invention comprises a process for producing olefins and hydrocarbons. The process comprises feeding a syngas stream comprising hydrogen and carbon monoxide to a hydrocarbon synthesis reactor under suitable conversion promoting conditions; converting at least a portion of the syngas stream to water and hydrocarbons in the hydrocarbon synthesis reactor so as to produce a hydrocarbon synthesis effluent gas and a hydrocarbon synthesis product, wherein the hydrocarbon synthesis effluent gas comprises at least a portion of said produced water, and wherein the hydrocarbon synthesis product comprises hydrocarbons; passing the hydrocarbon synthesis effluent gas in a separation unit so as to collect a product water stream, wherein the product water stream comprises organic compounds; fractionating the hydrocarbon synthesis product to at least form one light hydrocarbons fraction and one heavy hydrocarbons fraction; providing a process water comprising at least a portion of the product water stream; feeding the process water into a steam generator to form steam, wherein the steam includes a portion of the organic compounds from the portion of product water stream; and feeding at least a portion of said steam and at least a portion of the light hydrocarbons fraction into a steam cracker under suitable cracking conditions so as to crack at least a portion of the light hydrocarbons fraction and at least a portion of the organic compounds included in the steam to produce a steam cracker effluent, wherein the stream cracker effluent comprises at least one olefin. In preferred embodiments, the at least a portion of the light hydrocarbons comprises a naphtha cut. The hydrocarbon synthesis effluent gas may further comprise light hydrocarbons comprising between 1 and 5 carbon atoms.

In a third embodiment, the invention further comprises reacting a feedstream in a syngas production reactor to produce the syngas. The feedstream preferably comprises a hydrocarbon gas, such as natural gas or methane. The reaction step to form the syngas is preferably performed under conversion promoting conditions including in the presence of an oxidant, such as molecular oxygen, water (or steam), or combination thereof. The reaction step to produce the syngas further comprises forming water, and the method includes recovering from the syngas generation step a water stream comprising dissolved organics. At least a portion of said water stream from the syngas generation step can be part of the process water, which is passed into the steam generator to form steam. In alternate embodiments, the feedstream comprises coal or coke, and the reaction comprises gasification.

In other embodiments, the invention comprises treating the product water or the process water. Further embodiments include the hydrocarbon synthesis reactor comprising a Fischer-Tropsch reactor.

It will therefore be seen that a technical advantage of the invention includes using at least a portion of the product water comprising particularly oxygenates of a hydrocarbon synthesis process to steam crack hydrocarbons concurrently with at least a portion of the oxygenates, thereby eliminating the need to treat the portion of the product water used in the steam cracker in a wastewater treatment facility. Further advantages include a more economical way to produce steam for the steam cracking of Fischer-Tropsch naphtha, since the use of freshwater for generating steam for the steam cracker can be either eliminated or minimized. Additional advantages include an increase in carbon efficiency for the overall conversion of stranded gas to valuable (salable) products, as well as a more efficient and more economical process from the production of olefins in conjunction to a hydrocarbon synthesis process.

The disclosed devices and methods comprise a combination of features and advantages, which enable it to overcome the deficiencies of the prior art devices. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings, in which.

DETAILED DESCRIPTION OF THE PREFERRED EMBODIMENTS

Figure 1:
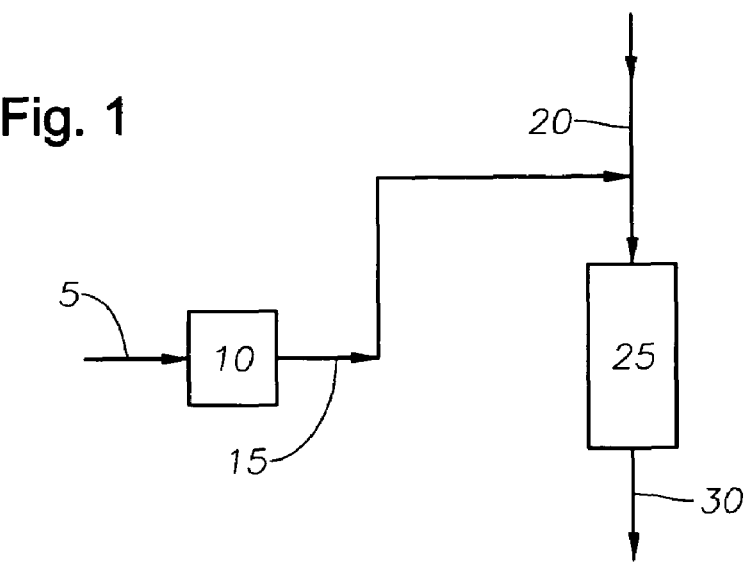
FIG. 1 illustrates a process water source comprising organic compounds from a GTL plant, a steam generator, and a steam cracker.

FIG. 1 illustrates a process water 5, a steam generator 10, steam 15, a light hydrocarbon feed 20, a steam cracker 25, and a steam cracker product 30.

The following describes an exemplary application of the present invention as illustrated in FIG. 1. Process water 5 is fed to steam generator 10. Process water 5 contains dissolved organic compounds.

Process water 5 can comprise organic compounds from one or more sources, which can either be generated or used in a gas-to-liquid plant. Without limiting the water sources, examples of suitable water sources for process water 5 include water generated by a synthesis such as by synthesis gas synthesis, hydrocarbon synthesis, and/or oxygenates synthesis; water generated from catalyst reduction, activation, re-activation, rejuvenation, or regeneration; water used in heat-exchanger units (such as cooling units using water as coolant); water used in steam generators; or sewer water, which originates from plant drainage. Process water 5 preferably comprises a process water from a synthesis gas production process, a product water from a hydrocarbon synthesis process, a product water from an oxygenates synthesis process, or combinations thereof. More preferably, process water 5 comprises at least a portion of a product water stream from a hydrocarbon synthesis process. The hydrocarbon synthesis process preferably includes a Fischer-Tropsch synthesis, and the product water from the Fischer-Tropsch process contains mostly oxygenated organic compounds, called oxygenates. It should be noted that process water 5 can further comprise some fresh water and/or treated water from a wastewater treatment facility. Preferably, the fresh water content of process water 5 is small. It should be appreciated that process water 5 may contain other organic compounds either non-oxygenated or comprising a heteroatom such as sulfur and/or nitrogen. Process water 5 preferably comprises at least one organic compound selected from the group consisting of hydrocarbons (for example olefins, aromatic and poly-aromatic hydrocarbons), alcohols, aldehydes, ketones, esters, aldols, ethers, acids and their corresponding anions (for example carboxylic acids and anions, such as acetic acid and acetate), and combinations thereof. Process water 5 can also contain inorganic compounds such as traces of metal-containing compounds derived from catalysts and/or equipment. For instance, traces of metal-containing compounds can comprise active components of the Fischer-Tropsch synthesis and/or the syngas production synthesis, such as an element from Groups 8, 9, 10 of the Periodic Table of Elements (New IUPAC notation). In addition, process water 5 can further comprise some fresh water or recycle water treated in a wastewater treatment facility. Preferably, the fresh water content of process water 5 is small.

In alternative embodiments (not illustrated), process water 5 can be treated before feeding to steam generator 10. Treatment of process water 5 can include removal of metals, neutralization of acidity in the water, adjustment of pH, adjustment of organic content, adsorption on solids, liquid absorption, gas stripping to remove some of the process water contaminants, and any other treatment suitable for application to pretreat process water 5 before its use in steam generator 10 and steam cracker 25. The metals can be removed by known processes such as for example ion exchange, adsorption bed, and/or distillation. The metals to be removed can include iron, cobalt, nickel, ruthenium, chromium, and any other metal(s) that may be present in catalysts and/or that may leach out of any equipment.

Process water 5 typically has a pH value below 7 and is therefore acidic. Thus, acidity of process water 5 can be neutralized by known processes, such as addition of a base, i.e., any compound that would liberate a hydroxide ion, or combinations of bases. Suitable bases include ammonia; urea; any hydroxide-containing compound such as ammonium hydroxide; an alkali element or alkali earth element from Groups 1-2 of the Periodic Table of Elements (new IUPAC notation) such as lithium, sodium, potassium, rubidium, calcium, strontium, or barium; any carbonate-containing compound; or any combination thereof. It will be understood that the water sources for process water 5 can be treated individually, collectively, or in combinations thereof. Alternatively, acidity of process water 5 can be adjusted by an ion-exchange step to replace some of the acidic anions with other more alkaline anions, such that the pH of process water 5 increases to a value that is more desirable, i.e., greater than about 6.

The production of steam from water is well known in the art and steam generator 10 includes any known process and equipment suitable for production of a desired steam 15 from process water 5 in the present invention. Preferably, steam 15 is fed with light hydrocarbon feed 20 into steam cracker 25.

The molar ratio of steam 15 to light hydrocarbon feed 20 fed into steam cracker 25 is from about 3:7 to about 7:3, preferably from about 3:7 to about 1:1, and more preferably about 1:2 (or 0.5). The use of steam crackers to crack hydrocarbons to yield olefins is well known in the art, and steam cracker 25 can comprise any known type of steam cracking equipment and operating conditions suitable for obtaining a desirable olefin yield. Preferably, steam cracker 25 comprises a furnace having tubes for circulating steam 15 and light hydrocarbon feed 20. The inlet temperature of steam 15 and light hydrocarbon feed 20 feeding into steam cracker 25 is preferably from about 825° C. to about 925° C. The residence time in steam cracker 25 is preferably from about 50 ms to about 300 ms. In addition, the exit temperature from steam cracker 25 of steam cracker product 30 is preferably from about 850° C. to about 950° C. The present invention is not limited to these temperatures and residence times but instead may have higher or lower values depending on the desired olefin yield, the type of steam cracking equipment used, the size of the steam cracking equipment used, and the like.

The preferred olefins produced in steam cracker 25 are ethylene and propylene, and more preferably ethylene. The olefin, ethylene and propylene yields should be at least 40 weight percent (wt %), 20 wt %, and 5 wt %, respectively, of steam cracker product 30. The preferable olefin yield is between about 40 wt % and about 70 wt % of steam cracker product 30 and more preferably between about 45 wt % and about 60 wt % of steam cracker product 30. The preferable ethylene yield is between about 20 wt % and about 45 wt % of steam cracker product 30 and more preferably between about 25 wt % and about 40 wt % weight percent of steam cracker product 30. In addition, the preferable yield of propylene is between about 5 wt % and about 30 wt % of steam cracker product 30 and more preferably between about 10 wt % and about 25 wt % weight percent of steam cracker product 30. The ratio of propylene yield to ethylene yield is preferably between about 0.3 and about 0.7. It will be understood that adjusting the residence time, inlet temperatures and ratio of steam 15 to light hydrocarbon feed 20 can adjust the yield of olefin products produced and also adjust the total olefin yield. Therefore, the present invention is not limited to a specific olefin and olefin product yield but includes any desired yield.

Figure 2:
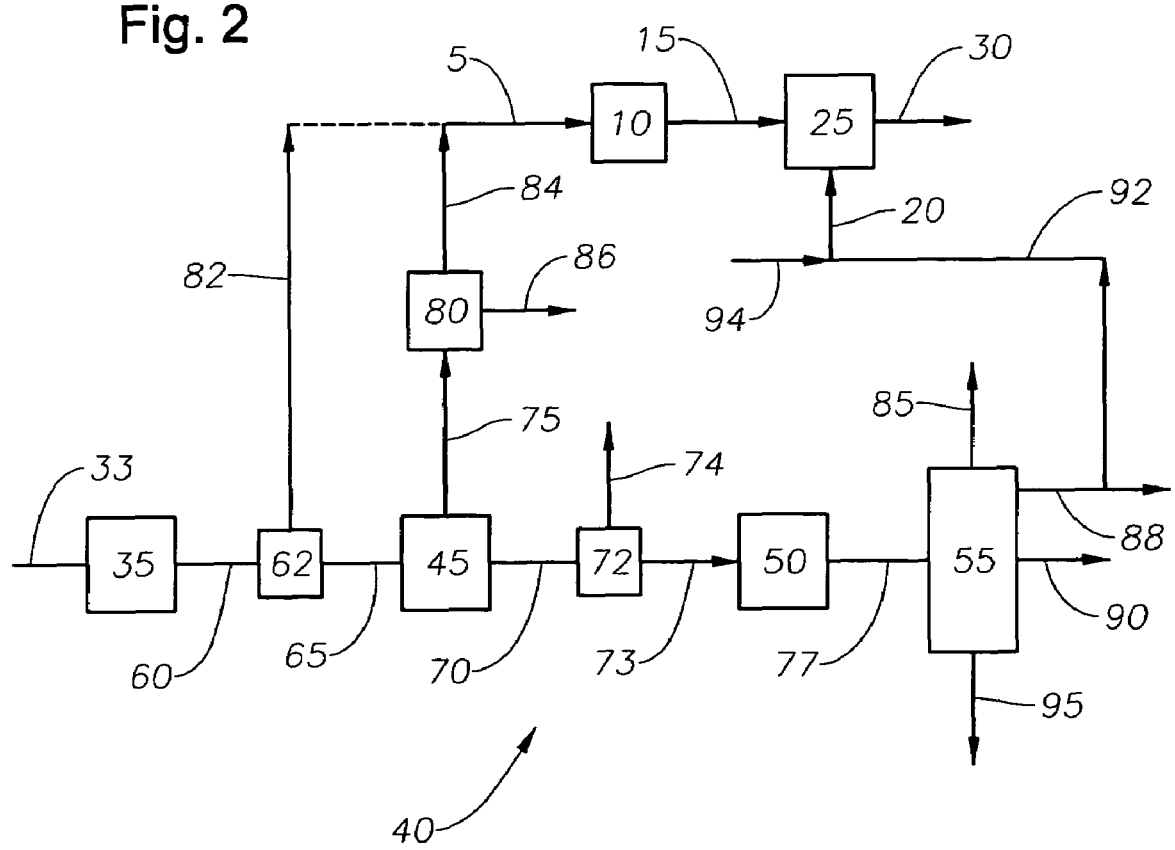
FIG. 2 illustrates the steam generator, the steam cracker, and a hydrocarbon synthesis process.

FIG. 2 illustrates another embodiment of the invention, comprising process water 5, steam generator 10, steam cracker 25, and a hydrocarbon synthesis process 40. Hydrocarbon synthesis process 40 comprises a syngas reactor 35, a hydrocarbon synthesis reactor 45, a hydroprocessor unit 50, and a fractionator 55. In alternative embodiments (not illustrated), hydrocarbon synthesis process 40 can also include an oxygenates synthesis reactor. Process water 5 comprises water from at least one source preferably from hydrocarbon synthesis process 40. Hydrocarbon synthesis process 40 preferably comprises a Fischer-Tropsch synthesis process. The sources of water in hydrocarbon synthesis process 40 can include hydrocarbon synthesis reactor 45, syngas reactor 35, hydroprocessing unit 50, water strippers (not illustrated), cooling units (not illustrated) that use water as coolant, fractionator 55, and any other source in hydrocarbon synthesis process 40 in which water may be present, utilized, or produced. Hydrocarbon synthesis reactor 45 and syngas reactor 35 are the preferable water sources.

The following describes an exemplary application of the present invention as embodied and illustrated in FIG. 2, which comprises substantially all of the elements of the above discussed embodiments and alternative embodiments as illustrated in FIG. 1 with the additional elements discussed below. In syngas reactor 35, feed stream 33 is converted to a gas stream 60 comprising syngas. The syngas comprises hydrogen and carbon monoxide. Feed stream 33 may comprise biomass and/or one hydrocarbon or mixture of hydrocarbons such as methane, natural gas, and/or coal. Feed stream 33 preferably comprises at least one light hydrocarbon such as methane or a mixture of light hydrocarbons, such as natural gas. Syngas reactor 35 may comprise one or more reactions selected from steam reforming, auto-thermal reforming, dry reforming, advanced gas heated reforming, partial oxidation, catalytic partial oxidation, gasification, or other processes known in the art suitable for generating synthesis gas. In one preferred embodiment, syngas reactor 35 comprises a partial oxidation reaction, more preferably a catalytic partial oxidation reaction, and feed stream 33 comprises at least 50 percent by volume of methane. Conditions and catalysts suitable for operating syngas reactor 35 comprising a catalytic partial oxidation reaction are disclosed in U.S. Pat. Nos. 6,402,989; 6,461,539; 6,488,907; 6,635,191; 6,409,940; 6,630,078; and published U.S. patent application 2002/0115730, each of which is herein incorporated by reference in its entirety. Suitable conditions and catalysts for operating reforming reactions are disclosed in V. R. Choudhary et al., in Catalysis Letters (1995) vol. 32, pp. 387-390; S. S. Bharadwaj & L. D. Schmidt in Fuel Process. Tech. (1995), vol. 42, pp. 109-127; and Y. H. Hu & E. Ruckenstein, in Catalysis Reviews—Science and Engineering (2002), vol. 44(3), pp. 423-453, each of which is incorporated herein by reference in its entirety. Suitable conditions for coal gasification for syngas production using Lurgi gasifiers are disclosed in M. E. Dry, in "The Fischer-Tropsch Synthesis", in "Catalyst Science and Technology", J. R. Anderson, et al., eds., Vol. 1, Springer-Verlag, Berlin, 1981, p. 169-170, which is incorporated herein in its entirety.

Gas stream 60 can be treated, scrubbed, stripped, compressed, cooled and/or passed through a separator in order to generate a suitable syngas feed to supply hydrocarbon synthesis reactor 45.

Gas stream 60 can also comprise water and is preferably passed through a separator 62 to yield syngas process water stream 82 and syngas feed 65. Separator 62 can comprise one or more separation techniques that are well-known in the art, such as but not limited to condensation, cryogenic separation, vacuum extraction, solvent extraction, filtration (for example, using a membrane, a molecular-sieve filter or a silica-based filter), distillation, and the like. Preferably, gas stream 60 is separated by condensation into a gaseous stream, i.e., syngas feed 65, and a liquid (condensate) stream, i.e., syngas process water stream 82. In a preferred embodiment where syngas reactor 35 comprises an exothermic syngas production such as a partial oxidation reaction, the temperature of gas stream 60 can be from about 700° C. to about 2,000° C. at the exit of syngas reactor 35. It is to be understood that the temperature of gas stream 60 can be decreased to less than 200° C. and possibly less than 100° C. The present invention is not limited to any type of condenser or cooling equipment, as any suitable equipment well known in the art can be used for cooling gas stream 60. The separated syngas feed 65 mainly comprises syngas, but it can also contain gaseous compounds, other than CO and $H_2$, such as for example $CO_2$ and unconverted light hydrocarbons such as methane, which are not condensed at the temperature conditions listed above.

Gas stream 60 typically further comprises organic compounds (other than the light hydrocarbon reactants), which are generated as by-products in syngas reactor 35. At least a portion of these organic compounds dissolve into the water contained in gas stream 60 such that syngas process water stream 82 comprises dissolved organic compounds. The dissolved organic compounds in syngas process water stream 82 can include one or combinations of these non-limiting examples: $C_1$-$C_4$ acids (e.g., formic, acetic, propionic, butyric) and corresponding anions (e.g., formate, acetate, propionate, butyrate), aldehydes (e.g., formaldehyde), alcohols (e.g., methanol), aromatic compounds (e.g., benzene, toluene, or xylene), and polyaromatic hydrocarbons (e.g., naphthalene, acenaphthylene, fluorene, phenanthrene, anthracene, fluoranthene, and pyrene).

Syngas feed 65 is supplied to hydrocarbon synthesis reactor 45. Hydrocarbon synthesis reactor 45 comprises any reactor in which hydrocarbons are produced from syngas by Fischer-Tropsch synthesis, alcohol synthesis, and any other suitable synthesis. Hydrocarbon synthesis reactor 45 preferably comprises at least one Fischer-Tropsch reactor. Any suitable Fischer-Tropsch catalyst for promoting the conversion of $H_2$ and CO to hydrocarbons may be employed in hydrocarbon synthesis reactor 45. The Fischer-Tropsch catalyst includes an active catalyst component either unsupported or supported on a material. The support material (also known as the catalyst support) may be a porous material that provides mechanical support for the active catalyst component. Examples of suitable support materials include boehmite and refractory oxides such as silica, alumina, titania, thoria, zirconia, or mixtures thereof such as silica-alumina. Other examples of suitable support materials are aluminum fluorides and fluorided alumina. The active catalyst component comprises at least one metal from Groups 8, 9, or 10 of the Periodic Table (based on the new IUPAC notation). Preferably, the active catalyst component is iron, cobalt, nickel, ruthenium, or mixtures thereof. The amount of active catalyst component present in the catalyst may vary. For instance, the unsupported catalyst may comprise up to about 90% by weight of the active metal per total weight of the catalyst. The supported catalyst may comprise about 1 to 50% by weight of the metal component per total weight of the metal component and support material, preferably from about 5 to 40% by weight, and more preferably from about 10 to 35% by weight. In addition, the Fischer-Tropsch catalyst may also comprise one or more promoters known to those skilled in the art. Suitable promoters include elements from Groups 1-5, 7, 8, 10, 11 and 13 of the Periodic Table (based on the new IUPAC notation). The catalyst may comprise at least one promoter typically chosen from the group comprising ruthenium, rhenium, platinum, palladium, silver, lithium, sodium, copper, boron, manganese, magnesium, and potassium. Catalysts suitable for operating hydrocarbon synthesis reactor 45 comprising a Fischer-Tropsch synthesis are disclosed in U.S. Pat. Nos. 6,333,294 and 6,365,544; and published U.S. Patent Application Nos. 2002/0037937; 2002/0173555; 2003/0065043; and 2003/0119922, each of which is herein incorporated by reference in its entirety. Typically, at least a portion of the catalytic metal is present in a reduced metallic state. Therefore, the Fischer-Tropsch catalyst is preferably activated by a reduction treatment, prior to its use in hydrocarbon synthesis reactor 45.

Syngas feed 65 may comprise at least one syngas stream synthesized from natural gas or methane, biomass, coal by gasification source, off-gas recycle from syngas reactor 35, and off-gas recycle from another syngas reactor. Preferably, at least a portion of syngas feed 65 comprises syngas synthesized from natural gas or methane. Preferably, the hydrogen is provided by free hydrogen, although some Fischer-Tropsch catalysts have sufficient water gas shift activity to form hydrogen (and $CO_2$) from water and CO for use in the Fischer-Tropsch synthesis. It is preferred that the molar ratio of hydrogen to carbon monoxide in syngas feed 65 be greater than 0.5:1 (e.g., from about 0.67 to about 2.5). Preferably, when cobalt, iron, nickel, and/or ruthenium catalysts are used, syngas feed 65 contains hydrogen and carbon monoxide in a molar ratio of about 1.4:1 to about 2.3:1. Syngas feed 65 may also contain carbon dioxide. Syngas feed 65 should contain only a low concentration of compounds or elements such as poisons that have a deleterious effect on the hydrocarbon synthesis catalyst present in hydrocarbon synthesis reactor 45. For example, syngas feed 65 may need to be pretreated to ensure that it contains low concentrations of sulfur-containing or nitrogen-containing compounds such as hydrogen sulfide, hydrogen cyanide, ammonia, and carbonyl sulfides.

Syngas feed 65 is contacted with the catalyst in a reaction zone comprised in hydrocarbon synthesis 45. Mechanical arrangements of conventional design may be employed as the reaction zone including, for example, fixed bed, fluidized bed, slurry bubble column, slurry phase, slurry bed, or ebullating bed reactors, among others. Accordingly, the preferred size and physical form of the catalyst particles may vary depending on the reactor in which they are to be used.

In a preferred embodiment, hydrocarbon synthesis reactor 45 comprises a Fischer-Tropsch reactor. The Fischer-Tropsch reactor is typically run in a continuous mode. In this mode, the gas hourly space velocity through the reaction zone typically may range from about 50 $hr^{-1}$ to about 10,000 $hr^{-1}$, preferably from about 300 $hr^{-1}$ to about 2,000 $hr^{-1}$. The gas hourly space velocity is defined as the volume of reactants per time per reaction zone volume. The volume of reactant gases is at standard conditions of pressure (101 kPa) and temperature (0° C.). The reaction zone volume is defined by the portion of the reaction vessel volume where the reaction takes place and which is occupied by a gaseous phase comprising reactants, products and/or inerts; a liquid phase comprising liquid/wax products and/or other liquids; and a solid phase comprising catalyst. In a preferred embodiment, the reaction zone has a slurry, wherein the slurry comprises catalyst particles suspended by a gas comprising reactant gases in a liquid comprising Fischer-Tropsch products. The reaction zone temperature is typically in the range from about 160° C. to about 300° C. Preferably, the reaction zone is operated at conversion promoting conditions at temperatures from about 190° C. to about 260° C., preferably between 205° C. and 230° C. The reaction zone pressure is typically in the range of about 80 psia (552 kPa) to about 1,000 psia (6,895 kPa), more preferably from 80 psia (552 kPa) to about 800 psia (5,515 kPa), and still more preferably, from about 140 psia (965 kPa) to about 750 psia (5,170 kPa). Most preferably, the reaction zone pressure is from about 250 psia (1,720 kPa) to about 650 psia (4,480 kPa).

The product of hydrocarbon synthesis reactor 45 is hydrocarbon synthesis product 70 and hydrocarbon synthesis effluent gas 75. Hydrocarbon synthesis product 70 may comprise some water albeit in small quantity. Thus, at least a portion of this water may be separated from hydrocarbon synthesis product 70 in a hydrocarbon synthesis separation unit 72 to form a water-reduced hydrocarbon synthesis product 73 and a water stream 74. Hydrocarbon synthesis separation unit 72 may comprise any known technique such as liquid-liquid separators, filtration, stripping, settling, centrifugations, hydrocyclones, and any other suitable technique. Suitable examples of removal of reaction water or product water from a Fischer-Tropsch slurry phase reactor are disclosed in U.S. Published Patent Application Nos. 2003/0125396; 2003/0149121; and 2003/0134913, each of which is herein incorporated by reference in its entirety.

Hydrocarbon synthesis product 70 comprises primarily hydrocarbons. Hydrocarbon synthesis product 70 may also comprise olefins, as well as oxygenated organic compounds, such as alcohols, aldehydes, organic acids, aldols, esters, and the like. Hydrocarbon synthesis effluent gas 75 comprises a majority of the water produced in hydrocarbon synthesis reactor 45 but may also comprise unconverted hydrogen and carbon monoxide, carbon dioxide, light hydrocarbons (typically $C_1$-$C_5$ hydrocarbons either saturated or unsaturated), and oxygenates (acids, alcohols, and the like). At least a portion of hydrocarbon synthesis effluent gas 75 is preferably passed through a water recovery unit 80 to generate a hydrocarbon synthesis product water stream 84 and a water-reduced hydrocarbon synthesis outlet gas 86. Water recovery unit 80 can comprise any known technique suitable for separating liquids from gases such as vapor separators, condenser, distillation, flash separators, cryogenic separation, and combinations thereof. Water recovery unit 80 preferably comprises one or more condensers. In one embodiment, water recovery unit 80 comprises two condensers operated at different temperatures (the downstream condenser being at a lower temperature than the upstream condenser) to maximize water recovery from hydrocarbon synthesis effluent gas 75. Although not illustrated, water recovery unit 80 may also provide a condensable hydrocarbon stream, which can then be sent directly to fractionator 55 or can be fed to hydroprocessing unit 50, either directly to unit 50 or by combining with water-reduced hydrocarbon synthesis product 73. The portion of hydrocarbon synthesis effluent gas 75 that is not sent to water recovery unit 80 (not shown) and water-reduced hydrocarbon synthesis outlet gas 86 can be recycled in part or totally to hydrocarbon synthesis reactor 45 and/or syngas reactor 35. Hydrocarbon synthesis product water stream 84 is fed partially or totally into steam generator 10 to produce steam 15 for steam cracker 25. Syngas process water stream 82 and/or water stream 74 may also be fed partially or totally into steam generator 10. Hydrocarbon synthesis product water stream 84 as well as water stream 74 include organic compounds that typically include one or combinations of these non-limiting examples: $C_1$-$C_4$ acids (e.g., acetic acid, propionic acid) and corresponding anions with either organic or inorganic cations (e.g., ethyl acetate, propionate, butyrate), aldehydes (e.g., propanal, butanal, pentanal), alcohols (e.g., methanol, ethanol, propanol, 2-propanol, butanol, 2-butanol, pentanol, hexanol), esters, aldols, ethers, carboxylic anions, and ketones (e.g., acetone, 2-butanone, 2-pentanone), preferably dissolved oxygenated organic compounds.

Further alternative embodiments include feeding water to steam generator 10 from at least one of hydrocarbon synthesis product water stream 84, syngas process water stream 82, water stream 74, any water stream(s) recovered from hydroprocessing unit 50, water strippers (not illustrated), a cooling unit; a catalyst regenerator (not illustrated), a catalyst activator, fractionator 55, and any other suitable source of water for steam 15. Therefore, process water 5, which supplies steam generator 10, may comprise at least a portion of hydrocarbon synthesis product water stream 84, at least a portion of syngas process water stream 82, at least a portion of water stream 74, or combinations thereof. The combination of at least a portion of hydrocarbon synthesis product water stream 84 and at least a portion of syngas process water stream 82 is illustrated in FIG. 2.

In other alternative embodiments, process water 5 and/or at least one of the water sources for process water 5 (such as streams 82, 84, and 74) are treated before feeding to steam generator 10. Treating may comprise adjusting the pH or the organic content of the process water.

Treating of process water 5 can comprise adjusting the pH of the process water prior to feeding it to steam generator 10. The pH adjustment preferably comprises neutralization of the process water, i.e., adjusting the pH, so as to obtain a pH in the treated process water greater than 6, preferably between 5.5 and 8.5, more preferably between about 6.5 and 7.5. The neutralization can be done by the addition of either a basic material (with a pH higher than 7) or an acidic material (with a pH lower than 7). The basic and acid material can be in the form of a solution. Typically, the product water from a hydrocarbon synthesis reactor is acidic, so neutralization of process water 5 preferably comprises adding a base, i.e., any compound (solid or liquid) that would liberate a hydroxide ion, or combinations of bases. Suitable bases include ammonia; urea; any hydroxide-containing compound such as ammonium hydroxide; an alkali element or alkali earth element from Groups 1-2 of the Periodic Table of Elements (new IUPAC notation) such as lithium, sodium, potassium, rubidium, calcium, strontium, or barium; any carbonate-containing compound; or any combination thereof. It will be understood that the water sources for process water 5 can be treated individually, collectively, or in combinations thereof.

Alternatively, treating of process water 5 may comprise an ion-exchange step to replace some of the acidic anions present in process water 5 by more alkaline anions, such that the pH of process water 5 increases to a value that is more desirable, i.e., greater than about 6.

Another treatment of process water 5 can comprise adjusting the organic content of the water. It is envisioned that the organic content may not be in a desirable range, and there may be a need to control the content of organic compounds (i.e., oxygenates) in the steam fed to steam cracker 25 within a particularly desirable range. Some hydrocarbon synthesis catalysts used in hydrocarbon synthesis reactor 45 can produce a greater proportion of oxygenates than other catalysts (for example, iron-based catalysts generate more oxygenates than a cobalt-based catalyst); and since oxygenates being more polar tend to have a greater solubility in water than less polar organic compounds, such as paraffins, process water 5 may contain a greater proportion of dissolved organics with these catalysts. An example of a treatment that can decrease the dissolved organic content of process water 5 includes passing a stripping gas to strip some of the more volatile organic compounds from the water phase so as to form two streams: an organic-lean stream that has a lower organic content than the original water stream and an organic-rich stream that has a higher organic content than the original water stream. The stripping gas is preferably a hot gas to increase the mass transfer of the more volatile organic compounds from the water to the stripping gas. The organic-rich stream can be sent back to hydrocarbon synthesis reactor 45, while the organic-lean stream can be used to generate steam for steam cracker 25; or the organic-rich stream can be used to generate steam for steam cracker 25. Steam cracker 25 may not be able to use all the hydrocarbon synthesis process water 5. Thus, dividing process water 5 into two streams in such a manner that one is enriched in organic compounds while the other is lean in organic content may provide a better carbon efficiency in the overall process for producing hydrocarbons and olefins. Another treatment of process water 5 comprises the use of a membrane, such as in a filtration unit, to generate two streams of different organic loads.

Water-reduced hydrocarbon synthesis product 73 is fed to hydroprocessing unit 50 where water-reduced hydrocarbon synthesis product 73 is hydroprocessed. Water-reduced hydrocarbon synthesis product 73 may be combined with a condensable hydrocarbon stream (not illustrated) collected from water recovery unit 80. As used herein, to "hydroprocess" means to treat a hydrocarbon-containing stream with hydrogen. The hydroprocessing preferably comprises a hydrotreatment step, which converts substantially all hydrocarbons present in water-reduced hydrocarbon synthesis product 73 to paraffins. As used herein, to "hydrotreat" means to treat a hydrocarbon stream with hydrogen without making any substantial change to the carbon backbone of the molecules in the hydrocarbon stream. For example, hydrotreating a hydrocarbon stream comprising predominantly $H_2C=CH-CH_2-CH_2-CH_3$ yields a hydrocarbon stream comprising predominantly $CH_3-CH_2-CH_2-CH_2-CH_3$. The hydrotreatment step may also convert oxygenates present in water-reduced hydrocarbon synthesis product 73 to saturated hydrocarbons but may also allow a substantial amount of the oxygenates to remain unconverted.

Hydrotreatment of a hydrocarbon synthesis reactor product is well known in the art, and water-reduced hydrocarbon synthesis reactor product 73 can be hydrotreated by any suitable hydrotreatment method. Hydrotreating in hydroprocessing unit 50 preferably comprise mild hydrotreating conditions. A mild hydrotreatment would have the benefits of converting substantially all unsaturated hydrocarbons fed to hydroprocessing unit 50 to saturated hydrocarbons, as well as removing a substantial portion or all of the heteroatoms from the heteroatomic compounds fed to hydroprocessing unit 50. The mild hydrotreatment may be performed over a hydrotreating catalyst comprising at least one metal from the group consisting of Ni, Co, Pd, Pt, Mo, W, Cu—Cr combinations, Cu—Zn combinations, and Ru, preferably comprising Ni, Co, Mo, W or combinations thereof, more preferably comprising Ni, over temperatures above 300° F. (about 150° C.), preferably from 350° F. to about 600° F. (about 170-315° C.), more preferably from 360° F. to about 600° F. (about 180-315° C.), with a hydrogen partial pressure in the outlet of hydroprocessing unit 50 between about 100 psia and about 2,000 psia (about 690-13,800 kPa).

Hydroprocessing in hydroprocessing unit 50 may also comprise a hydrocracking step, although it is not preferred. In some embodiments, hydroprocessing unit 50 comprises a hydrocracking zone, but the feedstream to said hydrocracking zone comprises only a portion of water-reduced hydrocarbon product 73, typically a higher boiling range fraction of water-reduced hydrocarbon product 73. As used herein, to "hydrocrack" means to split an organic molecule and add hydrogen to the resulting molecular fragments to form two smaller hydrocarbons (e.g., $C_{10}H_{22}+H_2 \rightarrow C_4H_{10}$ and skeletal isomers+$C_6H_{14}$ and skeletal isomers). Because a hydrocracking catalyst can be active in hydroisomerization, there can be some skeletal isomerization during the hydrocracking step. Therefore, isomers of the smaller hydrocarbons can be formed. Methods for hydrocracking are legion and well known in the art. The hydrocracking promoting conditions in hydroprocessing unit 50 comprise a temperature of about 500° F. to about 750° F. (260-400° C.) and at a pressure of about 500 psig to about 1,500 psig (3,550-10,440 kPa); an overall hydrogen consumption of 200-10,000 standard cubic feet per barrel of hydrocarbon feed (scf $H_2$/bbl HC) [about 35-1,800 STP $m^3 H_2/m^3$ HC feed], preferably 200-2,000 scf $H_2$/bbl HC [about 35-350 STP $m^3 H_2/m^3$ HC feed], more preferably 250-500 scf $H_2$/bbl HC [about 45-90 STP $m^3 H_2/m^3$ HC feed]; using a liquid hourly space velocity based on the hydrocarbon feedstock of about 0.1 to about 10 $hr^{-1}$, preferably between 0.25 to 5 $hr^{-1}$. The hydrocracking in hydroprocessing unit 50 preferably takes place over at least one hydrocracking catalyst comprising a hydrogenation component and a cracking component (typically an acid component). The hydrogenation component may include a metal selected from the group consisting of platinum (Pt), palladium (Pd), nickel (Ni), cobalt (Co), tungsten (W), molybdenum (Mo), and combinations thereof. The hydrogenation component in the hydrocracking catalysts preferably includes Pt, Pd, or combination thereof. The cracking component for the hydrocracking catalyst in a first hydroconversion zone may be an amorphous cracking material and/or a molecular sieve material. A preferred cracking component comprises an amorphous silica-alumina; however Y-type zeolite, SAPO-type molecular sieves (−11; −31; −37; −41), ZSM-type zeolites (−5; −11; −48), and dealuminated zeolites may also be used. The cracking component may support the hydrogenation component; however, the catalyst may further comprise a binder, which supports both hydrogenation component and cracking component.

Hydroprocessed product stream 77 leaves hydroprocessing unit 50 and is fed to fractionator 55 where it is separated into distillation cuts, including a light cut 85; at least one middle cut comprising light hydrocarbons including a naphtha cut 88 and a diesel cut 90; and a heavy cut 95. Methods of fractionation are well known in the art, and hydroprocessed product stream 77 can be fractionated in fractionator 55 by any suitable fractionation method.

Even though hydroprocessing unit 50 is shown upstream of fractionator 55, the Applicants envision that a hydroprocessing step can be performed on one or more individual fractions from fractionator 55, such as naphtha cut 88 and diesel cut 90, either instead of or in addition to the hydroprocessing of water-reduced hydrocarbon synthesis product 73. Regardless of where the hydroprocessing takes place, naphtha cut 88 comprises at least 70% paraffins, preferably at least 80% paraffins, and more preferably at least 90% paraffins.

Light hydrocarbon feed 20 to steam generator 25 preferably comprises at least a portion 92 of naphtha cut 88. Naphtha cut 88 preferably comprises Fischer-Tropsch naphtha. Naphtha cut 88 preferably comprises hydrocarbons with about 4 carbons to about 9 carbons. Naphtha cut 88 also preferably has a boiling point range of from about 40° C. to about 180° C. Fischer-Tropsch naphtha typically has a sulfur content of less than about 1.0 ppm. In addition, Fischer-Tropsch naphtha also typically has a total aromatics content of less than about 1%. In alternative embodiments, light hydrocarbon feed 20 comprises at least one of naphtha cut 88 (i.e., portion 92), at least a portion of diesel cut 90, and any other source as illustrated by hydrocarbon stream 94. Sources for hydrocarbon stream 94 may comprise naphtha or other middle distillates, such as streams derived from crude oils, shale oils, and/or tar sands and conventionally obtained from refineries; a portion of diesel cut 90; a biodiesel obtained from biomass; or combinations thereof. Further alternative embodiments include light hydrocarbon feed 20 comprising at least a portion of naphtha cut 88 and at least one of diesel cut 90, conventional refinery naphtha, conventional refinery diesel, ethanol, and other suitable hydrocarbons. Light hydrocarbon feed 20 and steam 15 are fed to steam cracker 25 to produce steam cracker product 30 comprising olefins. In other alternative embodiments, the at least one middle cut comprises one middle cut or more than two middle cuts.

Heavy cut 95 can be hydroprocessed to yield a synthetic fuel such as gasoline, diesel and jet fuel; lubricating oil; wax; or combinations thereof. The portions of naphtha cut 88 and/or diesel cut 90 not fed to steam cracker 25 can also be hydroprocessed. Such hydroprocessing comprises hydrotreating heavy cut 95 and such portions of naphtha 88 and/or diesel cut 90. In alternative embodiments, such hydroprocessing also includes hydrocracking heavy cut 95 and such portions of naphtha cut 88 and/or diesel cut 90. Such hydroprocessing preferably comprises the conditions and embodiments of hydroprocessing unit 50.

It is to be understood that hydrocarbon synthesis process 40 is not limited to the process steps as illustrated in FIG. 2 but can also include any known process steps for processing hydrocarbon synthesis product 70. For instance, embodiments can include more than one hydroprocessing unit (not illustrated), which can be upstream and/or downstream of the fractionation step. Additional embodiments can include fractionating hydrocarbon synthesis product 70 before hydrotreatment. Further embodiments (not illustrated) include hydrocracking heavy cut 95 and co-feeding a cracked hydrocarbon stream into fractionator 55.

Although the present invention and its advantages have been described in detail, it should be understood that various changes, substitutions and alterations may be made herein without departing from the spirit and scope of the invention as defined by the appended claims.

What is claimed is:

1. A process for making olefins, the process comprising:
   (A) providing a process water comprising at least a portion of a product water from a hydrocarbon synthesis process, wherein the process water contains organic compounds;
   (B) producing steam from the process water, wherein the steam includes at least a portion of the organic compounds from the process water; and
   (C) feeding the steam and a hydrocarbon feedstream containing a light hydrocarbon into a steam cracker under suitable cracking conditions so as to crack in the presence of the steam at least a portion of the light hydrocarbon and at least a portion of the organic compounds from the steam and to form a steam cracker effluent, wherein the steam cracker effluent comprises at least one olefin.

2. The process according to claim 1, wherein the hydrocarbon synthesis process of step (A) comprises a Fischer-Tropsch synthesis.

3. The process according to claim 1, wherein the organic compounds comprise oxygenated organic compounds.

4. The process according to claim 3, wherein the organic compounds comprise at least one oxygenate selected from the group consisting of alcohols, aldehydes, ketones, esters, aldols, ethers, acids, carboxylic anions, and combinations thereof.

5. The process according to claim 1, wherein the process water of step (A) further includes water from at least one source selected from the group consisting of a syngas reactor, a hydroprocessing unit, a water stripper, a cooling unit, a catalyst regenerator, a catalyst activator, and a fractionator.

6. The process according to claim 1, further comprising treating the process water prior to step (B).

7. The process according to claim 1, wherein the light hydrocarbon comprises a naphtha fraction, a diesel fraction, or combination thereof.

8. The process according to claim 7, wherein at least a portion of the naphtha fraction is derived from a Fischer-Tropsch synthesis.

9. The process according to claim 7, wherein at least a portion of the diesel fraction is derived from a Fischer-Tropsch synthesis.

10. The process according to claim 1, wherein the hydrocarbon feedstream further comprises conventional refinery naphtha, ethanol, or combination thereof.

11. The process according to claim 1, wherein step (C) further employs a steam to light hydrocarbon molar ratio of from about 3:7 to about 7:3.

12. The process according to claim 1, wherein the at least one olefin comprises ethylene, propylene, or combination thereof.

13. The process according to claim 1, further comprising hydrotreating the hydrocarbon feedstream prior to step (C).

14. A process for producing olefins and hydrocarbons, the process comprising:
   (A) feeding a syngas stream comprising hydrogen and carbon monoxide to a hydrocarbon synthesis reactor under suitable conversion promoting conditions;
   (B) converting at least a portion of the syngas stream to water and hydrocarbons in the hydrocarbon synthesis reactor so as to produce a hydrocarbon synthesis effluent gas and a hydrocarbon synthesis product, wherein the hydrocarbon synthesis effluent gas comprises at least a portion of said produced water, and wherein the hydrocarbon synthesis product comprises hydrocarbons;
   (C) passing the hydrocarbon synthesis effluent gas in a separation unit so as to collect a product water stream, wherein the product water stream comprises organic compounds;
   (D) fractionating the hydrocarbon synthesis product to at least form one light hydrocarbons fraction and one heavy hydrocarbons fraction;
   (E) providing a process water comprising at least a portion of the product water stream;
   (F) feeding the process water into a steam generator to form steam, wherein the steam includes at least a portion of the organic compounds from the portion of the product water stream; and
   (G) feeding said steam and at least a portion of the light hydrocarbons fraction into a steam cracker under suitable cracking conditions so as to crack at least a portion of the light hydrocarbons fraction and at least a portion of the organic compounds from the steam to produce a steam cracker effluent, wherein the stream cracker effluent comprises at least one olefin.

15. The process according to claim 14, wherein the hydrocarbon synthesis reactor comprises a Fischer-Tropsch synthesis.

16. The process according to claim 15, wherein the product water stream collected in step (C) comprises oxygenated organic compounds.

17. The process according to claim 15, wherein the product water stream collected in step (C) comprises at least one oxygenate selected from the group consisting of alcohols, aldehydes, esters, aldols, ethers, acids, carboxylic anions, and ketones.

18. The process according to claim 14, further comprising hydrotreating the hydrocarbon synthesis product produced in step (B).

19. The process according to claim 14, further comprising hydrotreating the light hydrocarbons fraction produced in step (D).

20. The process according to claim 14, wherein the portion of the light hydrocarbons fraction in step (G) comprise a naphtha cut.

21. The process according to claim 14, wherein the process water of step (E) further comprises water from at least one source selected from the group consisting of a syngas reactor, a hydroprocessing unit, a fractionator, a cooling unit, a catalyst regenerator, a catalyst activator, and a water stripper.

22. The process according to claim 14, further comprising treating the process water prior to step (F).

23. The process according to claim 14, wherein step (G) further comprises feeding to the steam cracker at least one material selected from the group consisting of a crude oil-derived naphtha, crude oil-derived diesel, and an ethanol.

24. The process according to claim 14, wherein step (G) further employs a steam to light hydrocarbon molar ratio of from about 3:7 to about 7:3.

25. The process according to claim 14, wherein the at least one olefin comprises ethylene, propylene, or combination thereof.

26. The process according to claim 14, wherein the steam cracker effluent comprises at least about 40 weight percent of one or more olefins.

27. The process according to claim 14, wherein the steam cracker effluent comprises at least about 20 weight percent ethylene.

28. The process according to claim 14, wherein the steam cracker effluent comprises at least about 5 weight percent propylene.

29. The process according to claim 14, wherein the process further comprises reacting a feedstream in a syngas reactor to produce the syngas stream.

30. The process according to claim 29, wherein the syngas reactor further generates a syngas reactor water, and wherein the process water provided in step (E) comprises at least a portion of said syngas reactor water.

* * * * *